Sept. 14, 1954        H. E. SMITH        2,689,034
ARTICULATED JOINT FOR SINUOUS CHAIN CONVEYERS
Filed Dec. 17, 1952                    3 Sheets-Sheet 1
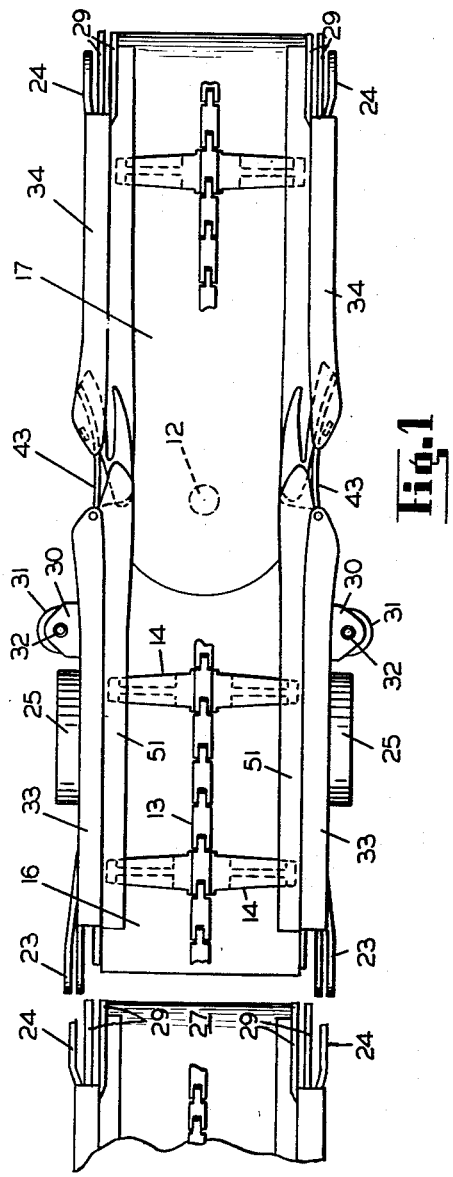
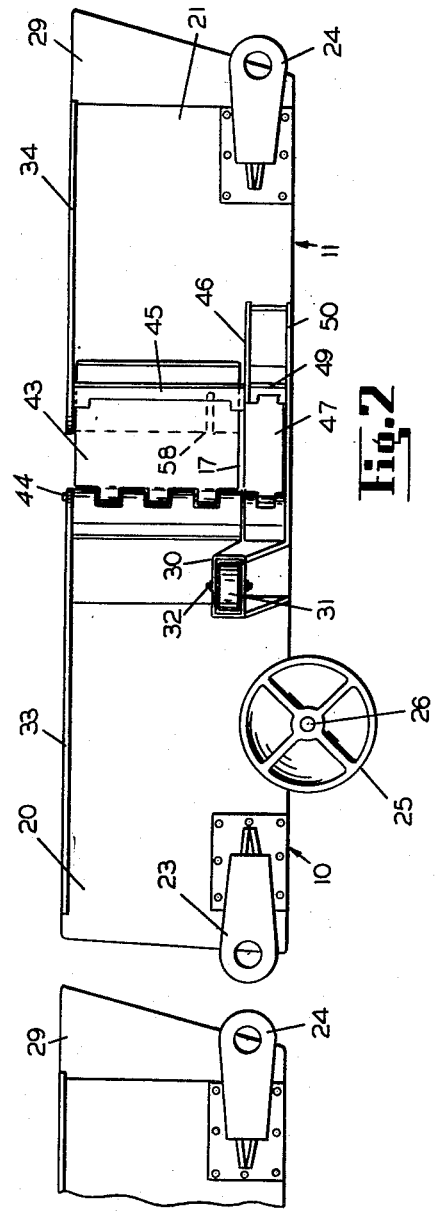
INVENTOR.
*Herman E. Smith*
BY
*Murray A. Gleeson*
ATTORNEY

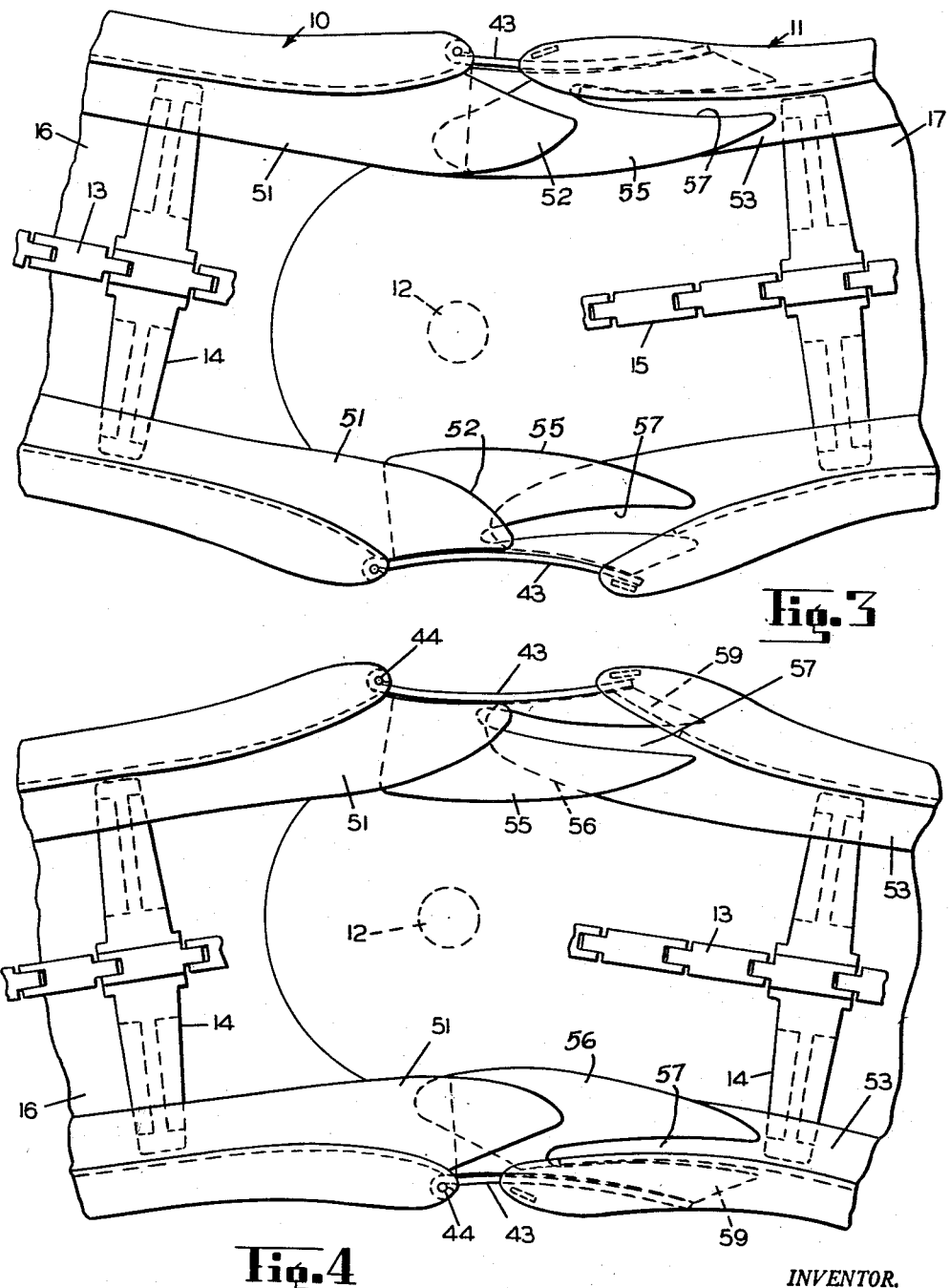

Patented Sept. 14, 1954

2,689,034

UNITED STATES PATENT OFFICE 2,689,034

ARTICULATED JOINT FOR SINUOUS CHAIN CONVEYERS

Herman E. Smith, Riverside, Ill., assignor to Goodman Manufacturing Company, Chicago, Ill., a corporation of Illinois Application December 17, 1952, Serial No. 326,458

4 Claims. (Cl. 198—109)

1

This invention relates to improvements in conveyors and more particularly relates to an improved closure means and flight hold down across the gaps between adjacent ends of the troughs of an articulated conveyor.

An object of my invention is to provide a novel and improved form of closure means for closing the gaps between adjacent ends of the troughs of an articulated conveyor, having a retaining guide associated therewith, holding the flights down to the bottom of the conveyor trough in all positions of articulation of the trough sections of the conveyor with respect to each other.

Another object of my invention is to provide an articulated trough construction for a sinuous conveyor of the center strand chain and flight type having a simple form of hold down means, holding down the flights as they pass by the articulated joints of the conveyor and maintaining the closure plates at the gaps between the side walls of the conveyor into slidable engagement therewith as the trough sections of the conveyor are pivoted with respect to each other A further object of my invention is to provide a closure means for a sinuous flight conveyor, closing the gaps between adjacent ends of the trough sections of the conveyor and holding down the conveyor flights during movement along the articulated joint thereof, which is of a simpler form and more economical construction than the conventional gap closure and articulated joint structures heretofore used in flexible conveyors of this type.

A still further object of my invention is to provide a means for closing the gaps between adjacent side walls of the trough sections of an articulated conveyor at the articulated joint thereof, wherein the closure means also forms a hold down for the ends of the flights at the joints between the trough sections of the conveyor, and is retained in closure engagement with the side walls of the trough sections of the conveyor by slidable engagement of the hold down therewith.

These and other objects of my invention will appear from time to time as the following specification proceeds and with reference to the accompanying drawings wherein:

Figure 1 is a top plan view of an articulated trough section of a sinuous conveyor, illustrating one form in which my invention may be embodied;

Figure 2 is a view in side elevation of the trough section shown in Figure 1;

Figure 3 is an enlarged fragmentary plan view

Figure 5:
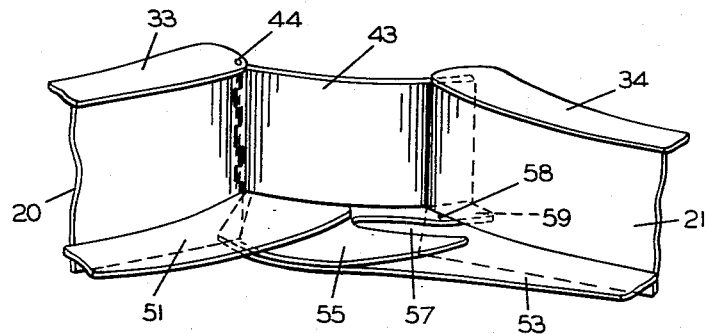
Figure 6:
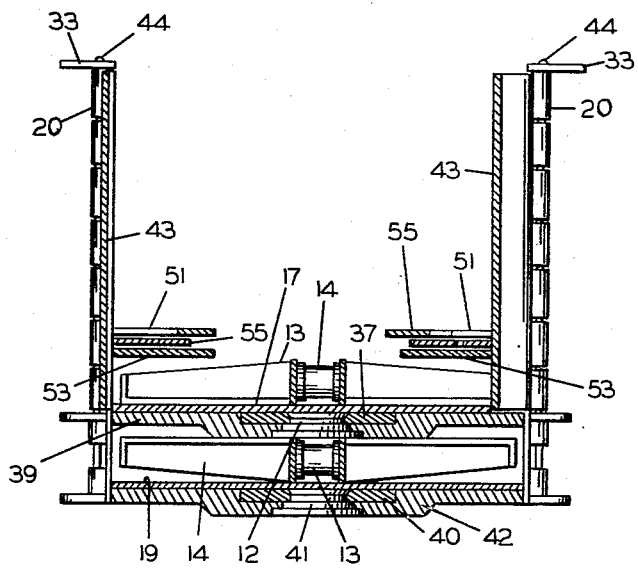

2 showing the articulated joint of the articulated conveyor section with the two sections shown in one laterally extended position with respect to each other;

Figure 4 is a view somewhat similar to Figure 3, but showing the trough sections in an opposite position from the position shown in Figure 3;

Figure 5 is a fragmentary isometric view with the bottom pan of the conveyor removed and looking inwardly toward the side walls thereof; and Figure 6 is a fragmentary transverse sectional view taken through the conveyor at the pivot thereof.

In the embodiment of my invention illustrated in the drawings, the sinuous conveyor may be made up of a series of conveyor trough units, each including two similar trough sections 10 and 11, connected together at their ends in end to end relation with respect to each other. The trough sections 10 and 11 are shown as being pivotally connected at their adjacent ends for movement about the axis of an upright pin 12. A laterally flexible endless chain 13 having parallel spaced transverse flights 14, 14 pivotally connected thereto at suitable intervals, passes along the center of the conveyor troughs 10 and 11 for conveying loose material therealong, the flights being guided at their ends on the insides of the side walls of the troughs of the conveyor.

The conveyor chain 13 and flights 14, 14 are shown as being of a conventional laterally flexible construction, including a plurality of links 15, 15 connected together for movement about horizontal axes and having pivotal connection with opposite sides of the flights 14, 14 for pivotal movement about vertical axes, giving the conveyor sufficient lateral flexibility to conform to the trough sections 10 and 11, when in various laterally extended positions with respect to each other about the axis of the pin 12.

The upper run of the conveyor is shown as being movable along the top surface of material-carrying pans 16 and 17 of the respective trough sections 10 and 11. The return run of the conveyor may, as usual, be guided for movement beneath the pans 16 and 17 along under pans 19, 19 supporting the return run of the conveyor.

The trough sections 10 and 11 are shown as having upstanding generally parallel side walls 20, 20 and 21, 21 respectively, extending above and below the pans 16 and 17, and suitably secured to opposite sides thereof, and to opposite sides of the bottom pans 19, 19 as by welding.

At the ends of the side walls 20, 20 and secured thereto, inwardly of the ends thereof, are bifurcated coupling members 23, 23, adapted to receive coupling tongues 24, 24, spaced laterally from and extending forwardly of the adjacent side walls 21, 21 of the next adjacent trough section. The coupling tongues 24, 24 are adapted to extend within the space between the furcations of the coupling members 23, 23, and to be pivotally connected thereto as by horizontally extending coupling pins (not shown), connecting said trough sections to conform to rolling ground.

Supporting the trough sections 10 and 11 on the ground for movement therealong is a pair of wheels 25, 25 rotatably mounted on opposite ends of an axle 26, which may extend beneath the trough section 10 and be suitably secured thereto. The wheels 25, 25 are mounted intermediate the ends of the trough section 10 and besides forming a support for the conveyor on the ground also enable a person to grasp the end of the trough section 11 as by coupling tongues 24, 24 and lift the same and wheel the individual trough sections along the ground as a wheelbarrow, when assembling or disconnecting the conveyor to extend or move the same to a new location.

The free end of the bottom pan 17 of the trough section 11 may be curved downwardly from the horizontal as indicated by reference character 27 and slidably engaged by an overlapping beveled or arcuate free end of the bottom plate 16, so as to form a continuous trough with no gap therebetween, where the ground may be uneven, and to prevent the spilling of coal at the joints between the individual trough sections and to provide a smooth uninterrupted conveying surface across the joints thereof.

The side walls 21, 21 are likewise shown as having spaced retaining plates 29, 29 secured to opposite sides thereof, and extending forwardly therefrom and having slidable engagement with opposite sides of the side walls 20, 20 of the next adjacent trough section to maintain the gaps between adjacent ends of the trough sections closed, when one trough section is vertically displaced with respect to the other.

Brackets 30, 30 are shown as extending outwardly from the side walls 20, 20 rearwardly of the wheels 25, 25 and as having rollers 31, 31 mounted thereon for rotation about vertical pivot pins 32, 32. Said rollers may engage an arcuate guide (not shown), which may be positioned about a corner where the mine room communicates with the mine entry, to accommodate the sinuous conveyor to be connected to and extended from a loading machine, or continuous mining machine, out of the working place and along a mine entry extending at right angles to the working place and to be advanced with the loading machine and load into a main line conveyor extending along the entry, as in an application Serial No. 203,676, filed by Frank Cartlidge on December 30, 1950 and entitled "Portable Conveying Apparatus."

The trough section 10 is shown as having flanges 33, 33 extending laterally outwardly from the upper ends of the side walls 20, 20 and forming a stiffening means therefor. The trough section 11 is shown as having similar flanges 34, 34 extending laterally outwardly from the tops of the side walls 21, 21 thereof.

The end of the plate 16, adjacent the plate 17, is shown as being concavely formed by an arc struck from the center of the pin 12 and as having slidable engagement with a coaxial convex arcuate end portion of the plate 17. As shown in Figure 6, the pin 12 is mounted in a plate 37, secured to the bottom of the pan 17, and extends downwardly from said plate 37. The end of the pin 12 is rotatably mounted in a cross frame member 39 extending along the bottom of the plate 37 and secured to the trough section 10 between the side walls thereof. In a like manner the bottom pan 19 has a plate 40 secured to the bottom thereof, in which is mounted a pivot pin 41, depending therefrom and pivotally mounted in a cross-frame member 42, secured to the trough section 10 between the side walls thereof.

The means for closing the gaps between the adjacent ends of the side walls 20 and 21 of the trough sections 10 and 11 are herein shown as comprising two upright closure plates 43, 43 interleaving the inner ends of the side walls 20, 20 and pivotally connected thereto on vertical pivot pins 44, 44. The closure plates 43, 43 are shown as being of a generally arcuate form, extending across the gaps between the adjacent ends of the side walls 20 and 21 and slidably engaging the outer sides of the side walls 21, 21. The closure plates 43, 43 extend within retainer bars 45, 45 extending vertically along the side walls 21, 21. The retainer bars 45, 45 are secured at their upper ends to the bottoms of the flanges 34, 34 and at their lower ends to ears 46, 46 extending outwardly from the side walls 21, 21 adjacent the bottom plate 17 thereof.

The gaps beneath the bottom plate 17 are shown as being closed by closure plates 47, 47, interleaving the portions of the side walls 20, 20 beneath the plate 17 and slidably engaging the side walls 21, 21. Each closure plate 47 is retained in engagement with an associated side wall 21 by a retainer bar 49. Each retainer bar 49 is shown as being mounted between the bottom of an ear 46 extending outwardly from the side wall 21 in substantial alignment with the bottom plate 17 and a downwardly spaced ear 50 extending laterally from the side wall 21, adjacent the bottom thereof.

Spaced upwardly from and parallel to the bottom plate 16 are inwardly extending hold-down flanges 51, 51. The hold down flanges 51, 51 may be secured to the insides of the side walls 20, 20, as by welding, and extend therealong parallel to the bottom pan 16 for substantially the length thereof. The undersurfaces of the hold down flanges 51, 51 may be slidably engaged by the upper surfaces of the flights 14, 14 to retain said flights to the bottom plate 16 during travel therealong, particularly when the trough sections 10 and 11 are in various positions of articulation with respect to each other. Each hold down 51 is shown as extending beyond the inner end of the associated side wall 20 along, but spaced inwardly from the associated closure plate 43 and as having an advance outer edge 52 curved or inclined outwardly from said closure plate and engaging said closure plate when the trough sections 10 and 11 are in extreme positions of articulation.

Hold down flanges 53, 53 similar to the hold down flanges 51, 51, but spaced therebeneath, extend along the side walls 21, 21 and slidably engage the under surfaces of intermediate hold down plates 55, 55 secured to the closure plate 43 and extending inwardly therefrom. Each hold down flange 53 is shown as extending beyond the end of the side wall 21 and as having an outer edge 56 curving inwardly toward the closure member 43 and engaging the same in the extreme positions of articulation of the trough sections.

In Figures 5 and 6, the hold down flange 51 is shown as overlapping the hold down plate 55 in the region of articulation of the trough sections 10 and 11 and as slidably moving therealong during articulation of the trough sections 10 and 11. The hold down plate 55 is likewise shown as overlapping the hold down plate 53 and as being slidably movable therealong as the trough sections 10 and 11 are pivotally moved with respect to each other. The direction of travel of the conveyor chain 13 and flights 14, 14 along the trough sections 10 and 11 is thus from the trough section 11 to the trough section 10 with the flights 14, 14 traveling from the hold down flanges 53, 53 to and beneath the hold down plates 55, 55 and hold down flanges 51, 51.

Each hold down plate 55 is shown as having an elongated slot 57 formed therein and opening toward the adjacent end of the side wall 21. Each side wall 21 is shown as having a slot 58 formed therein opening to the hold down plate 55 and receiving an inner end 59 thereof when the trough sections are in the position shown in Figure 5. The slot 57 is shown as being curved to conform generally to the path of travel of the side wall 21 at the inner end of the slot 58 in all positions of articulation of the trough sections 10 and 11 with respect to each other. The slot 57 is shown as extending along oppostie sides of the side wall from the inner end of the slot 58, as one trough section is pivoted with respect to the other about the axis of the pivot pin 12.

The edges of the slot 57 in the hold down plate 55, engaging opposite sides of the side wall 21 from within the slot 58, thus serve to maintain the hold down plate 55 in position to close the gap between the hold down flanges 51 and 53 in all positions of articulation of the conveyor. The slot 57 in cooperation with the side wall 21 also pivotally moves the closure plate 43 and maintains said closure plate in engagement with the side wall 21, as the trough sections 10 and 11 are pivoted with respect to each other about the axis of the pivot pin 12.

It will be understood that modifications and variations of the present invention may be effected without departing from the spirit and scope of the novel concepts thereof.

I claim as my invention:

1. An articulated conveyor unit comprising two pivoted trough sections, each having a bottom plate and upright side walls adapted to have an endless chain and flights movable therealong, and means closing the gaps between said side walls in all positions of articulation of said trough sections with respect to each other comprising closure plates pivoted to the ends of the side walls of the rear of said trough sections and extending along the outsides of the side walls of the forward of said trough sections, hold down guides extending inwardly of said closure plates in parallel relation with respect to said bottom plates and spaced thereabove and having slots extending therealong opening toward said side walls for engagement with opposite sides thereof to retain said closure plates to the outsides of the side walls of the forward of said trough sections in all positions of articulation of said trough sections with respect to each other.

2. An articulated conveyor unit comprising two aligned pivoted trough sections, each having bottom pans and generally parallel upright side walls adapted to have a center strand laterally flexible endless chain and flights movable therealong between said side walls, means closing the gaps between said side walls comprising closure plates pivoted to the ends of the side walls of the rear of said trough sections and extending along the outsides of the side walls of the forward of said trough sections, hold down members extending inwardly of said side walls in parallel relation with respect to said bottom pans, and means holding down said flights in the region of articulation of said trough sections comprising hold down plates secured to said closure plates and underlapping one of said hold down members and overlapping the other and having elongated arcuate slots extending therealong opening toward the side walls of the forward of said trough sections, said last mentioned side walls also having slots opening toward said hold down plates and receiving the same and accommodating said slots in said hold down plates to slidably engage opposite sides of said side walls and move said closure plates to follow the forward of said trough sections in all positions of articulation of the conveyor.

3. In an articulated conveyor structure, two trough sections, each having a bottom pan and upright side walls extending along each side thereof, a vertical pivot pin pivotally connecting adjacent ends of said bottom pans together, a laterally flexible center strand chain having flights projecting laterally therefrom guided for movement between said side walls on the ends of said flights, hold down flanges extending inwardly of said side walls for engagement with said flights, means closing the gaps between said side walls comprising closure plates vertically pivoted to opposite side walls of the rear of said trough sections and extending along the outsides of the side walls of the forward of said trough sections, means retaining said closure plates to move along the side walls of the forward of said trough sections and closing the gaps between said hold down flanges in all positions of articulation of said trough sections with respect to each other comprising hold down plates secured to said closure plates and extending inwardly therefrom in overlapping relation with respect to the forward of said hold down flanges and in underlapping relation with respect to the rear of said hold down flanges, said hold down plates each having an elongated slot therein having slidable engagement with opposite sides of the walls to the next adjacent trough section and pivoted thereby upon pivotal movement of said trough sections with respect to each other for maintaining a continuous hold down flange in the region of articulation of the conveyor and moving said closure plates to maintain an uninterrupted flow of material along said trough sections.

4. In an articulated conveyor structure, two trough sections, each having a bottom pan and upright side walls extending along each side thereof, a vertical pivot pin pivotally connecting adjacent ends of said bottom pans together, a center strand chain and flights guided for movement between said side walls, hold down flanges for the ends of said flights extending inwardly of said side walls, means closing the gaps between said side walls comprising closure plates vertically pivoted to the ends of opposite side walls of the rear of said trough sections and extending along the outsides of the side walls of the forward of said trough sections, means retaining said closure plates to move along the forward of said trough sections and closing the gaps between adjacent ends of said hold down flanges comprising hold down plates extending inwardly from said closure plates in overlapping relation with respect to the forward of said hold down flanges and in underlapping relation with respect to the rear of said hold down flanges, said hold down plates each having an elongated slot therein, and the forward of said side walls each having a slot extending therealong in registry with the associated hold down, accommodating the walls of said slot in the associated hold down to engage opposite sides of an associated side wall and be pivotally moved thereby upon pivotal movement of said trough sections with respect to each other.

References Cited in the file of this patent

UNITED STATES PATENTS

| Number | Name | Date |
|---|---|---|
| 2,366,407 | Jeffrey | Jan. 2, 1945 |
| 2,381,108 | Cartlidge | Aug. 7, 1945 |
| 2,512,610 | Cartlidge | June 27, 1950 |